United States Patent
Lee et al.

(10) Patent No.: US 12,043,136 B2
(45) Date of Patent: Jul. 23, 2024

(54) POWER SUPPLY METHOD OF CHARGER FOR ELECTRIC VEHICLE

(71) Applicant: EVAR, Seongnam-si (KR)

(72) Inventors: Hun Lee, Suwon-si (KR); Dong Hyuk Shin, Seongnam-si (KR); Ki Jae Kim, Seoul (KR)

(73) Assignee: EVAR, Seongnam-si (KR)

( * ) Notice: Subject to any disclaimer, the term of this patent is extended or adjusted under 35 U.S.C. 154(b) by 97 days.

(21) Appl. No.: 17/842,383

(22) Filed: Jun. 16, 2022

(65) Prior Publication Data

US 2022/0314834 A1    Oct. 6, 2022

Related U.S. Application Data

(63) Continuation of application No. PCT/KR2020/017216, filed on Nov. 30, 2020.

(30) Foreign Application Priority Data

Dec. 19, 2019    (KR) .................. 10-2019-0170594

(51) Int. Cl.
*B60L 53/67*    (2019.01)
*B60L 53/30*    (2019.01)
(Continued)

(52) U.S. Cl.
CPC .............. *B60L 53/67* (2019.02); *B60L 53/305* (2019.02); *B60L 53/31* (2019.02); *G05B 15/02* (2013.01);
(Continued)

(58) Field of Classification Search
CPC ..................................................... B60L 53/67
(Continued)

(56) References Cited

U.S. PATENT DOCUMENTS

| 2012/0126743 A1* | 5/2012 | Rivers, Jr. ................. H02J 3/14 |
| | | 320/137 |
| 2013/0009599 A1* | 1/2013 | Yukizane ................ B60L 53/63 |
| | | 320/109 |

(Continued)

FOREIGN PATENT DOCUMENTS

| JP | 2011-155737 A | 8/2011 |
| JP | 2013-090570 A | 5/2013 |

(Continued)

OTHER PUBLICATIONS

An Office Action; "Notice of Reasons for Refusal," mailed by the Japanese Patent Office on Jul. 27, 2023, which corresponds to Japanese Patent Application No. 2022-537411 and is related to U.S. Appl. No. 17/842,383.

(Continued)

*Primary Examiner* — Jerry D Robbins
(74) *Attorney, Agent, or Firm* — Studebaker & Brackett PC

(57) ABSTRACT

The present invention relates to a power supply method of an electric vehicle charger in which multiple chargers are connected to the same power supply source, the power supply method comprising operations of allowing an electric vehicle to be connected to a first charger, generating a charging start signal from the first charger, receiving, by one or more other chargers, the charging start signal, generating a charging state signal from the other chargers, receiving, by the first charger, the charging state signal and determining the amount of supplied power of the first charger.

12 Claims, 14 Drawing Sheets

(51) Int. Cl.
  *B60L 53/31* (2019.01)
  *G05B 15/02* (2006.01)
  *H02J 7/00* (2006.01)
(52) U.S. Cl.
  CPC ........ *H02J 7/0013* (2013.01); *H02J 7/00712* (2020.01)
(58) Field of Classification Search
  USPC .......................................................... 320/109
  See application file for complete search history.

(56) References Cited

U.S. PATENT DOCUMENTS

| | | | |
|---|---|---|---|
| 2014/0049213 A1* | 2/2014 | Bianco | B60L 53/305 |
| | | | 320/109 |
| 2015/0102775 A1* | 4/2015 | Von Novak, III | B60L 53/63 |
| | | | 320/109 |
| 2015/0326050 A1* | 11/2015 | Baek | H02J 9/005 |
| | | | 320/137 |
| 2016/0207413 A1 | 7/2016 | Atluri et al. | |
| 2016/0297314 A1* | 10/2016 | Iwai | B60L 53/68 |
| 2021/0046840 A1* | 2/2021 | Brombach | H02J 7/00 |
| 2022/0258632 A1* | 8/2022 | Ehrenhalt | B60L 53/14 |

FOREIGN PATENT DOCUMENTS

| | | |
|---|---|---|
| JP | 2013-192290 A | 9/2013 |
| JP | 2015-019465 A | 1/2015 |
| JP | 2018-129994 A | 8/2018 |
| JP | 2019-129684 A | 8/2019 |
| KR | 10-2013-0077670 A | 7/2013 |
| KR | 10-1353904 B1 | 1/2014 |
| KR | 10-2015-0130856 A | 11/2015 |
| KR | 10-2017-0068877 A | 6/2017 |
| KR | 10-2041839 B1 | 11/2019 |
| KR | 10-2131275 B1 | 7/2020 |
| WO | 2015/016184 A1 | 2/2015 |

OTHER PUBLICATIONS

International Search Report issued in PCT/KR2020/017216; mailed Mar. 5, 2021.
The extended European search report issued by the European Patent Office on Nov. 8, 2023, which corresponds to European Patent Application No. 20901724.3-1202 and is related to U.S. Appl. No. 17/842,383.
Decision to Grant a Patent mailed by the Japanese Patent Office on Dec. 28, 2023, which corresponds to Japanese Patent Application No. 2022-537411 and is related to U.S. Appl. No. 17/842,383.

* cited by examiner

-- Prior Art -- ical Field

The present invention relates to a power supply method of an electric vehicle charger, and more particularly, to a power supply method of a charger for an electric vehicle that can efficiently control power distribution through communication between chargers connected to the same power supply source (power grid) without an external communication function.

BACKGROUND ART

An electric vehicle (EV) is future convergence technology that is receiving attention and investment from governments and companies around the world along with the trend of a global green growth policy. Accordingly, the demand tendency of the automobile industry market is quickly changing from conventional oil-based vehicles to electric vehicles.

Along with the increase in demand for electric vehicles, technology development not only for electric vehicles but also for infrastructure construction (charging devices, power supply grids, etc.) for smooth use of electric vehicles is being actively conducted.

However, since the infrastructure construction according to the supply of electric vehicles is relatively incomplete, methods and technologies for charging a large number of electric vehicles are being developed recently. In particular, in the case of an office building or an apartment house, the excess of power reception capacity due to the addition of charging infrastructure for electric vehicles in electric power management may affect the daily power used by residents or cause a large-scale power shortage.

As related art for solving these problems, a conventional technique shown in FIG. 1 will be described.

In order to charge multiple electric vehicles in the related art, a power supply source 10 includes a main charger 30 and multiple sub-chargers 40 directly controlled by the main charger 30. The main charger 30 directly controls the amount of power supplied to the sub-chargers 40 and is in charge of communication with an external server 20.

Specifically, the main charger 30 includes a measurement unit 31 for monitoring the amount of power used by the sub-chargers 40 and a unit charging amount, a power supply unit 32, a communication unit 33 for communicating with the server 20 and the sub-chargers 40, and a control unit 34 for controlling the number of sub-chargers to be operated or controlling a communication function, and the sub-charger 40 includes an outlet 41 built in the apparatus together with a fixed wiring and a connector 42 to be docked with an electric vehicle charging unit.

In the case of this conventional centralized multi-charging method, when the main charger fails, the sub-chargers cannot operate, the installation and maintenance costs of the main charger are quite large, and communication between the sub-chargers is impossible. Thus, immediate power distribution is difficult.

DISCLOSURE

Technical Problem

The present invention has been created to solve the above problems and is directed to providing a power supply method of an electric vehicle charger that, by only using chargers that do not have a function of communicating with the outside, can efficiently distribute the amount of power to the chargers without a main charger.

Specifically, the present invention provides a power supply method of a charger for an electric vehicle capable of efficiently distributing the amount of electric power supplied by each charger to an electric vehicle within the maximum amount of electric power by enabling mutual communication between chargers connected to the same electric power supply source.

Also, provided is a power supply method for a charger for an electric vehicle that can lower overall charger installation costs by not installing a separate main charger.

The technical objects of the present invention are not limited to those described above, and other technical objects that are not described herein will be apparently understood by those skilled in the art from the following description.

TECHNICAL SOLUTION

To achieve the above objects, a power supply method of an electric vehicle charger in which multiple chargers are connected to the same power supply source may include operations of: allowing an electric vehicle to be connected to a first charger, generating a charging start signal from the first charger, receiving, by one or more other chargers, the charging start signal, generating a charging state signal from the other chargers, receiving, by the first charger, the charging state signal; and determining the amount of supplied power of the first charger. Accordingly, by only using chargers that do not have a function of communicating with the outside, it is possible to efficiently distribute the amount of power to the chargers without a main charger.

Also, in an embodiment of the present invention, the operation of generating a charging state signal from the other chargers may include operations of determining whether an electric vehicle is connected to a second charger, generating a charging progress signal or a charging standby signal from the second charger, and transmitting the generated signal to the first charger, and the charging progress signal may be a signal generated when the electric vehicle is being charged, and the charging standby signal may be a signal generated when the second charger is on standby. Accordingly, it is possible for the chargers to share whether each charger is in use for charging with each other.

Also, in an embodiment of the present invention, the operation of generating a charging state signal may include operations of determining whether an electric vehicle is connected to a second charger and generating a charging progress signal from the second charger, the operation of receiving, by the first charger, the charging state signal may include an operation of checking whether the charging state signal is received within a set time, and when the charging state signal is not transmitted within the set time, the first charger determines that the second charger is on standby.

Accordingly, it is possible for the chargers to share whether each charger is on standby with each other.

Also, in an embodiment of the present invention, the operation of determining the amount of supplied power of the first charger may include operations of storing the number of times the charging progress signal is received, computing the amount of power available for supply to the first charger, and supplying the power to the first charger, and the amount of power supplied to the first charger may reflect the number of times the charging progress signal is received. Accordingly, by only using chargers that do not have a function of communicating with the outside, it is possible to efficiently distribute the amount of power to the chargers without a main charger.

Also, in an embodiment of the present invention, the amount of power supplied to the first charger may be less than or equal to a value obtained by dividing the maximum amount of power by one greater than the number of times the charging progress signal is received. Accordingly, when two or more vehicles are charged through a charger in the same power supply source on the basis of the shared state of each charger, it is possible to properly distribute the amount of power.

Also, in an embodiment of the present invention, the operation of determining the amount of supplied power of the first charger may further include an operation of determining whether a fast charging mode is set, and when the fast charging mode is set, the first charger may receive more than a set amount of power from the power supply source. Accordingly, by allowing a user to set the fast charging mode according to his or her need, it is possible to increase charging efficiency and increase the profitability of charger providers.

Also, in an embodiment of the present invention, the operation of supplying the power to the first charger may include operations of generating a charging start time signal, generating a fast charging mode progress signal, and receiving, by the other chargers, the charging start time signal and the fast charging mode progress signal, and when the other chargers receive the fast charging mode progress signal, the maximum amount of power supplied from the power supply source is limited. Accordingly, it is possible to limit the number of chargers that can select the fast charging mode.

Also, in an embodiment of the present invention, the operation of supplying the power to the first charger may include operations of generating a charging start time signal and receiving, by the other chargers, the charging start time signal. Accordingly, by sharing a charging start time between chargers, it is possible to set a criterion that can be used for power distribution.

Also, in an embodiment of the present invention, the method may further include operations of terminating the charging of any one charger, generating a charging termination signal from the charger, receiving, by the other chargers, the charging termination signal; and determining the amount of supplied power of the other chargers. Accordingly, it is possible to share whether the charging of each charger is terminated.

Also, in an embodiment of the present invention, the operation of determining the amount of supplied power of the other chargers may include operations of checking a charging start time signal received by a third charger and determining the amount of power distributed to the third charger. Accordingly, based on the shared state of each charger, it is possible to supply more idle power to chargers that are in use for charging.

Also, in an embodiment of the present invention, the operation of determining the amount of power distributed to the third charger may include operations of comparing a charging start time of the third charger to the received charging start time signal and calculating priority, and the amount of distributed power may be determined according to the calculated priority. By giving priority to an electric vehicle that starts charging first, it is possible to supply electric power quickly and efficiently within a limited amount of power.

Also, in an embodiment of the present invention, a power supply system of an electric vehicle charger includes multiple chargers connected to the same power supply source and configured to communicate with each other, and when an electric vehicle is connected to one charger, a charging start signal is transmitted from the charger to which the electric vehicle is connected to one or more other chargers, a charging state signal is transmitted from the other chargers to the charger to which the electric vehicle is connected, and the amount of power supplied to the charger to which the electric vehicle is connected is determined according to the charging state signal. Accordingly, by only using chargers that do not have a function of communicating with the outside, it is possible to efficiently distribute the amount of power to the chargers.

Also, in an embodiment of the present invention, each of the chargers may include a connector connected to an electric vehicle and configured to supply power, a control unit configured to control the amount of power supplied to the connector, the control unit including a communication unit in charge of communication with other chargers, and a connection unit connected to a power supply source and configured to perform a fast charging mode or a slow charging mode according to a signal of the control unit.

Also, in an embodiment of the present invention, at least one of the multiple chargers may be capable of communicating with an external server. Accordingly, by setting one charger capable of communicating with an external server for payment, it is possible to help smooth payment of the other chargers.

Also, in an embodiment of the present invention, at least one of the multiple chargers may be a movable charger including a movable means for moving to a location where an electric vehicle is parked.

ADVANTAGEOUS EFFECTS

According to the disclosed embodiment of the present invention, by only using chargers that do not have a function of communicating with the outside, it is possible to efficiently distribute the amount of power to the chargers.

Also, it is possible for the chargers to share the state of each charger with each other.

Also, it is possible to shorten a charging time by efficiently distributing the limited maximum amount of power to each charger.

Also, it is possible to reduce total charger installation costs by omitting a component such as the conventional main charger.

The effects of the present invention are not limited to those described above, and other effects that are not described herein will be apparently understood by those skilled in the art from the following description.

MODE FOR CARRYING OUT THE INVENTION

Figure 1:
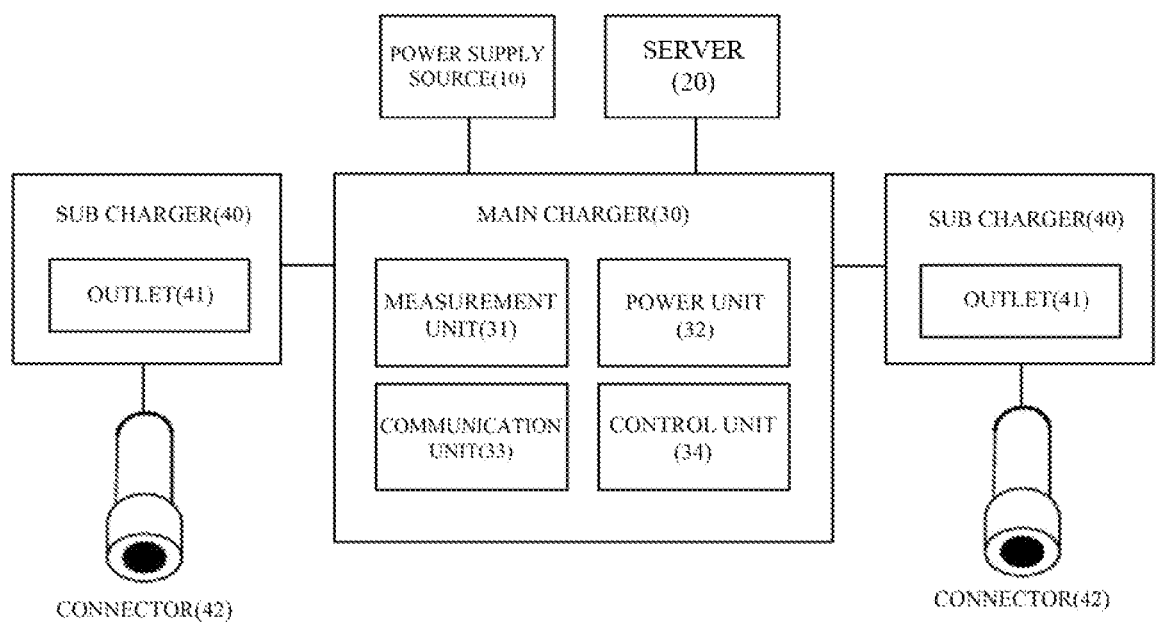
FIG. 1 is a diagram schematically illustrating a conventional power distribution system composed of a main charger and multiple sub-chargers.

Advantages and features of the present invention and implementation methods thereof will be clarified through the following embodiments described in detail with reference to the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The terminology used herein is for the purpose of describing particular embodiments only and is not intended to be limiting of the invention. Herein, the singular shall be construed to include the plural, unless the context clearly indicates otherwise. The terms "comprises" and/or "comprising" used herein specify the presence of stated elements but do not preclude the presence or addition of one or more other elements. Like reference numerals refer to like elements throughout the specification, and the term "and/or" includes any and all combinations of one or more of the associated listed items. It will be also understood that, although the terms first, second, etc. may be used herein to describe various elements, these elements should not be limited by these terms. These terms are only used to distinguish one element from another. Thus, a first element could be named a second element without departing from the technical spirit of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "unit" or "module" refers to a software element or a hardware element such as a field-programmable gate array (FPGA) or an application-specific integrated circuit (ASIC), and a "unit" or "module" performs any role. However, a "unit" or "module" is not limited to software or hardware. A "unit" or "module" may be configured to reside in an addressable storage medium or to execute one or more processors. Therefore, for example, a "unit" or "module" includes elements, such as software elements, object-oriented software elements, class elements, and task elements, processes, functions, attributes, procedures, subroutines, segments of program code, drivers, firmware, microcode, circuits, data, database, data structures, tables, arrays, and variables. Furthermore, functions provided in elements and "units" or "modules" may be combined into as a smaller number of elements and "units" or further divided into additional elements and "units."

Herein, a computer refers to any kind of hardware device including at least one processor and may be understood as encompassing software configurations operating in corresponding hardware devices depending on the embodiment. For example, a computer may be understood as including smartphones, tablet PCs, desktops, notebooks, and user clients and applications running in such devices. However, the present invention is not limited thereto.

Hereinafter, the embodiments of the present invention will be described in detail with reference to the accompanying drawings.

Herein, each operation will be described as being performed by a computer, but the subject of each operation is not limited thereto, and at least some of the operations may be performed in different devices depending on the embodiment.

In an embodiment of the present invention, an electric vehicle charging system may be defined as a system that basically charges a battery mounted in an electric vehicle by using electric power of an energy storage device or a commercial power supply source. Such an electric vehicle charging system may have various forms depending on the type of electric vehicle. For example, the electric vehicle charging system may include a cable-based conductive charging system or a non-contact wireless power transmission system.

Also, in an embodiment of the present invention, an electric vehicle (EV) may be referred to as an electric car, an electric automobile, an electric road vehicle (ERV), a plug-in vehicle (PV or xEV), and the like, and a power supply source may include residential or public electric service or a generator that uses vehicle-mounted fuel.

Also, in an embodiment of the present invention, the connection between an electric vehicle and a charger may refer to a procedure in which a connector (or wireless charging device) disposed to transmit power is associated with the electric vehicle. Specifically, the procedure includes a process of exchanging information necessary for command and control communication, control, and termination between the electric vehicle and the charger.

Meanwhile, in an embodiment, the charger includes not only wired charging but also wireless charging. A wireless power charging system may refer to a system for control between a GA and a VA including wireless power transmission and alignment and communication. Wireless power transfer may refer to transferring electrical power from an alternating current (AC) power supply network to an electric vehicle through contactless means.

Also, according to an embodiment of the present invention, chargers can communicate with each other. Various methods may be applied for communication between chargers. For example, Bluetooth that communicates within a short distance of less than 10 m, a beacon that communicates within a short distance of less than 70 m, Addictive Links Online Hawaii Area (ALOHA) corresponding to a contention-type multiple access protocol that randomly accesses a common transmission channel without central control, Wi-Fi, PLC communication, and P2P communication may be applied.

Also, the charger according to an embodiment of the present invention may be a charger that corresponds to one of a fast charger or a slow charger or a charger to which the two modes are applied.

Hereinafter, preferred embodiments of the present invention will be described in detail with reference to the accompanying drawings.

Figure 2:
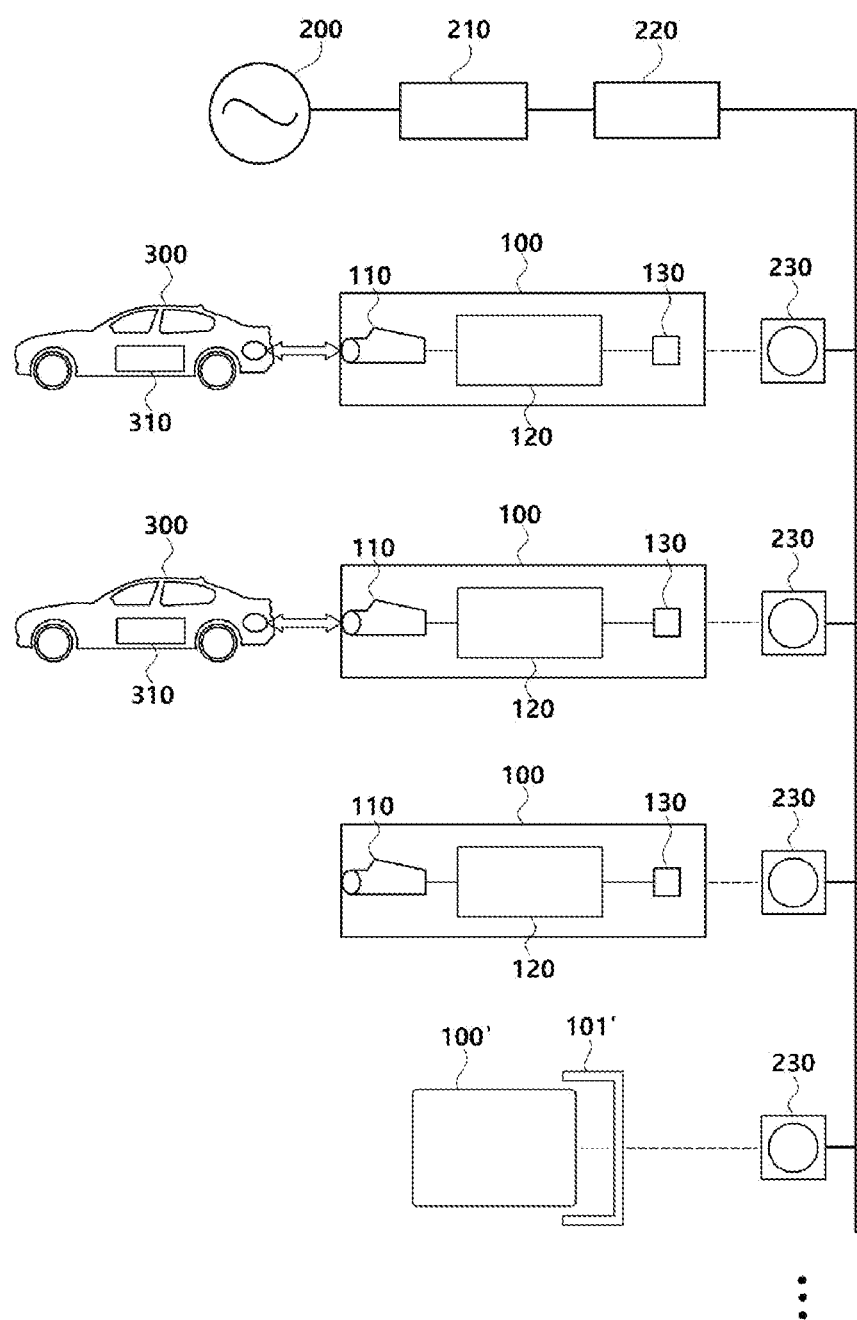
FIG. 2 is a diagram illustrating multiple chargers and an electric vehicle connected thereto according to an embodiment.

FIG. 2 is a conceptual diagram illustrating a power distribution method of an electric vehicle charger according to an embodiment of the present invention.

Referring to FIG. 2, multiple chargers 100 according to an embodiment of the present invention are connected to the same power supply source 200. The power supply source 200 has a limit to the power available for supply, and this limit of power may be defined as the maximum amount of power. In the case of a building, the maximum power available for supply to one building may be defined as the maximum amount of power.

Electricity from the power supply source 200 is supplied to the charger 100 through a distribution box 210, a meter 220, and a power supply unit 230. The distribution box 210 is an element that has a function of receiving electricity from the outside, supplying electricity to the power supply unit 230, and shutting off electricity in case of failure. The meter 220 is a meter that measures and records the total amount of power used for a certain period of time. The power supply unit 230 has the same configuration as an outlet and is an element to which the charger 100 is directly connected to receive power. Meanwhile, the electricity of the power supply source 200 may be directly connected to chargers through wires without the power supply unit 230. Depending on the installation environment or the nature of the charger, the power supply unit 230 may be selectively applied.

Multiple chargers 100 may be installed at one power supply source 200, and the number of installed chargers may be limited by the maximum amount of power that can be supplied by the power supply source 200. The multiple chargers 100 connected to one power supply source 200 may be installed in a mixture of various types.

As shown in FIG. 2, some of the multiple chargers may be stationary chargers 100, and the others may be movable chargers 100'. The stationary charger 100 is directly connected to the power supply unit 230, and for charging, an electric vehicle 300 should be driven in front of the charger 100.

The movable charger 100' includes a power connection unit 101' coupled to the power supply unit 230 and a moving means that can move to where the electric vehicle 300 is parked. In the charging standby state, the movable charger 100' is connected to the power connection unit 101' to receive electricity from the power supply source 200. When a charging request is received through an application or various communication means, the movable charger 100' moves to where the electric vehicle 300 is located according to the charging request signal and performs the charging of the electric vehicle 300.

Meanwhile, according to an embodiment of the present invention, at least one of a wired charging method and a wireless charging method may be applied to the multiple chargers 100, and the wired and/or wireless charging methods may be applied to both the stationary charger 100 and the movable charger 100'.

Each charger 100 according to an embodiment of the present invention includes a connector 110 directly connected to the electric vehicle 300 to supply power, a control unit 120 for controlling the amount of power supplied to the connector 110, and a connection unit 130 connected to the power supply unit 230. When the charger 100 adopts a wireless method or additionally includes a wireless method, the charger 100 may include a wireless charging panel. However, there are also embodiments in which the connection unit 130 is not provided together with the power supply unit 230. According to the installation environment of the charger and the specifications of the charger, the connection unit 130 may be selectively applied.

The electric vehicle 300 may include a communication controller 310 for communicating with other external devices, and the communication controller 310 is an element that can communicate with the connector 110 and a user terminal. Generally, the communication between the electric vehicle 300 and the charger may be made only when the charger is a DC fast charger. On the other hand, in the case of a slow charger, it is common that the communication between the charger and the electric vehicle 300 is not made.

Meanwhile, referring to FIG. 2, it can be seen that a main charger or a central control unit for collectively controlling the multiple chargers 100 is not provided. It is possible to control the amount of power supplied to each charger only with general chargers without a separate central control unit or main charger. Specifically, the multiple chargers 100 are provided to communicate with each other, and the detailed configuration of the charger 100 will be described with reference to FIG. 3.

Figure 3:
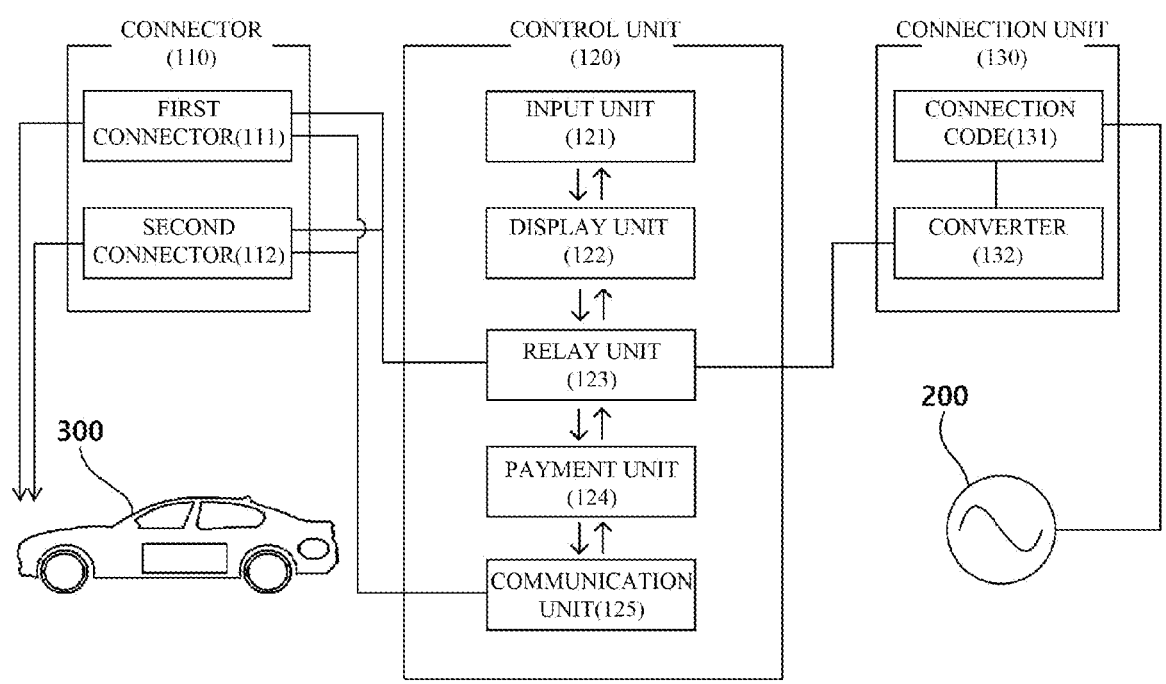
FIG. 3 is a diagram illustrating a relationship between components constituting each charger according to an embodiment.

FIG. 3 is a schematic diagram of detailed elements constituting each charger 100.

The connector 110 includes a first connector 111 and a second connector 112 which are directly connected to the electric vehicle 300 to supply power.

The first connector 111 is a charging terminal for supporting charging in a combo 1 method and is formed of a combination of a single-phase AC slow charging socket and a DC fast charging socket. This is mainly used in the United States.

The second connector 112 is a charging terminal for supporting charging in a combo 2 method and is formed of a combination of a three-phase AC slow charging socket and a DC fast charging socket. This is mainly used in Europe.

Advantageously, the second connector 112 can be applied to more various situations and vehicles than the first connector 111 because there are various charging methods for supporting the second connector 112, such as DC single charging, DC and three-phase AC power, DC and single-phase AC power, and three-phase AC single charging.

Meanwhile, the scope of the present invention for the connector 110 is not limited thereto. At least one of the first connector 111 and the second connector 112 may be applied as the connector 110, and another type of connector, for example, a J1772 slow connector, may be applied.

In another embodiment, the charger may not be provided with a connector and a cable. In this case, only the socket is installed in the charger, and the connector or cable may be separately purchased and used by a user who wants to use the charger.

The control unit 120 may be composed of one or more processors and memories or may be composed of a computer. The control unit 120 is in charge of communication with the charger 100 connected to the same power supply source 200 and the control of the amount of power supplied to the connected electric vehicle 300.

Specifically, the control unit 120 may include an input unit 121, a display unit 122, a relay unit 123, a payment unit 124, and a communication unit 125. However, some of the above elements may be omitted, and a separate element may be further added if necessary. The description of the configuration of the control unit 120 is for explaining the operating aspect of the charger 100 according to an embodiment of the present invention.

The input unit 121 includes multiple keys for inputting charging request information, and data input to the keys is delivered to the control unit 120. For example, through the key input, it is possible to reserve charging, immediately start and terminate charging, input a charging reservation time, input numeric information, and input user information and vehicle information. Meanwhile, the input unit 121 may be replaced with a touch unit that is displayed on a display instead of a physical key. However, a charger according to another embodiment does not include the input unit 121. Various methods for controlling the charger may be applied without a separate input unit 121.

The display unit 122 may be configured by the control unit 120 to display information such as operation state information on whether the charger 100 is in use for charging or on standby, the price per watt (W) or kilowatt (kW) of charging power, the remaining amount of battery power, the full amount of battery power, and the time required for fully charging. However, the display unit 122 may not be provided depending on the charger 100.

The relay unit 123 includes a relay and is configured to connect the output power of a converter 132 to the first connector 111 or the second connector 112 under the control of the control unit 120. The relay may be implemented using a device such as an insulated-gate bipolar transistor (IGBT). When there is only one combo constituting the connector 110, the configuration of the relay unit 150 may be omitted.

The payment unit 124 is a device such as a card reader, a cash counting device, and a universal subscriber identity module (USIM) reader and is configured to provide payment information about the charging power used by a user to the control unit 120. However, the multiple chargers 100 according to an embodiment of the present invention may not include the payment unit 124 except for any one charger. The other chargers that do not include the payment unit 124 may transmit information on the charging power used by the user to the charger 100 including the payment unit 124. The charger 100 including the payment unit 124 may further include a separate communication device capable of communicating with an external server, which will be described below.

However, according to another embodiment of the present invention, the multiple chargers 100 do not include the payment unit 124. Information on charging power that is used by the user and measured by each charger 100 may be connected to the user's payment means through any one charger 100 connected to the external server. The user's payment means may be card information registered in the application or account information preregistered by the user.

The communication unit 125 is an element that enables communication between the multiple chargers 100 and can share information on each charger 100 using a power line communication (PLC) method or a peer-to-peer (P2P) communication method. In addition to PLC communication or P2P communication, pulse width modulation) (PWM) communication, controller area network (CAN) communication, media oriented systems transport (MOST) communication, local interconnect network (LIN) communication, Bluetooth communication, ALOHA communication, and beacon communication., etc. may be used.

The communication unit 125 is used to transmit or receive information on whether each charger 100 is in use for charging or on standby, information on whether an electric vehicle is connected, information on whether charging is terminated, information on the amount of power used when each electric vehicle is charged and the amount of power available for supply, etc.

Also, the communication unit 125 may be used to transmit or receive other charging-related information. For example, the communication unit 125 may be involved in the operation of the first connector 111 or the second connector 112 according to a signal from the control unit 120 and may also communicate with the parked electric vehicle 300.

The connection unit 130 is composed of a connection cord 131 connected to the power supply unit 230 and a converter 132 configured to perform voltage conversion.

The converter 132 may include both an AC/DC converter function and a DC/DC converter function and may supply suitable power depending on whether a charging mode selected by a user is a fast mode or a slow mode, according to the type of combo in which the electric vehicle is connected.

In an embodiment of the present invention, the converter 132 may adjust the amount of power supplied to the electric vehicle connected according to the result of communication between the multiple chargers 100 by the communication unit 125. The amount of power allocated to each charger is determined by the communication between the multiple chargers 100, and a detailed algorithm for this will be described below.

FIGS. 4 to 7 schematically illustrate and simplify a mutual communication process between the multiple chargers 100 when an electric vehicle that requires charging is connected to any one of the multiple chargers 100 connected to the same power supply source 200.

Figure 4:
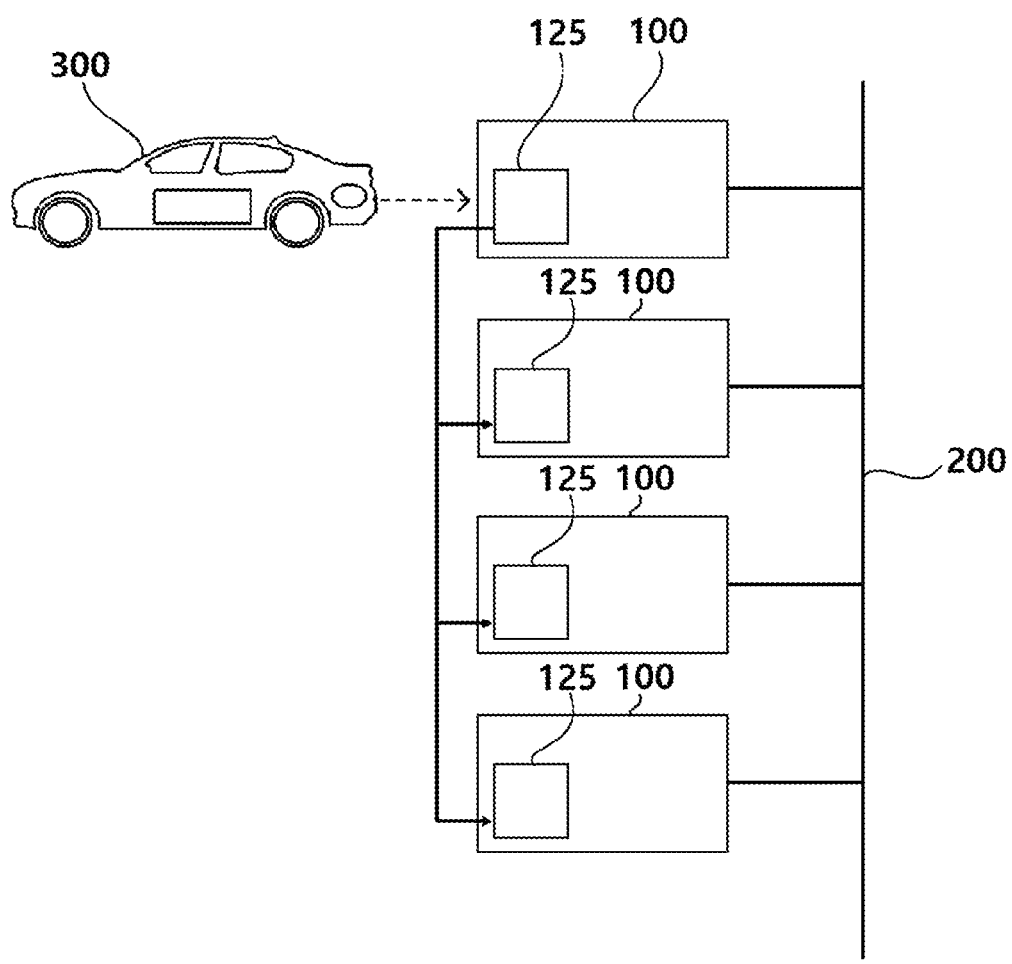
FIGS. 4 and 5 illustrate a process of mutual communication between chargers when an electric vehicle is connected.
Figure 5:
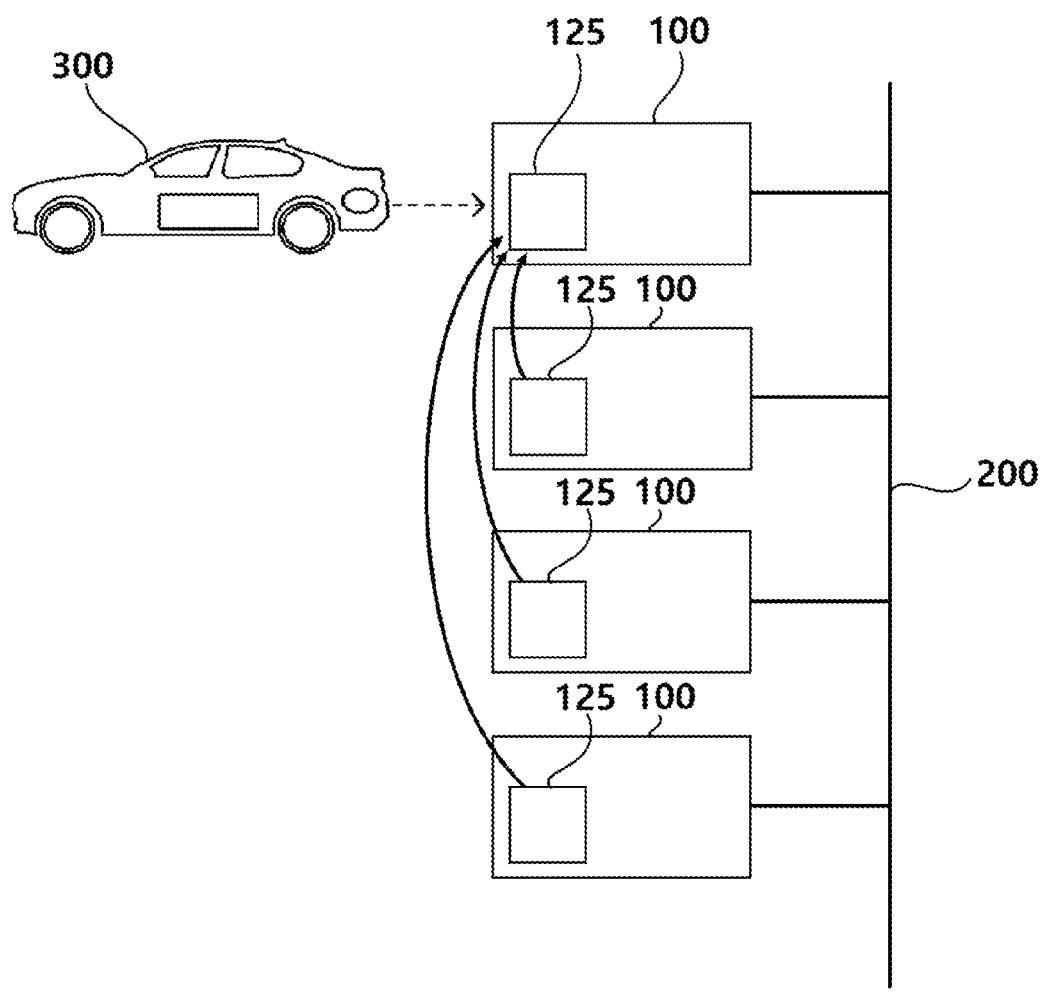

FIGS. 4 and 5 schematically illustrate a mutual communication process between chargers when one electric vehicle 300 is connected to any one charger while multiple chargers 100 connected to the same power supply source 200 are on standby.

Figure 6:
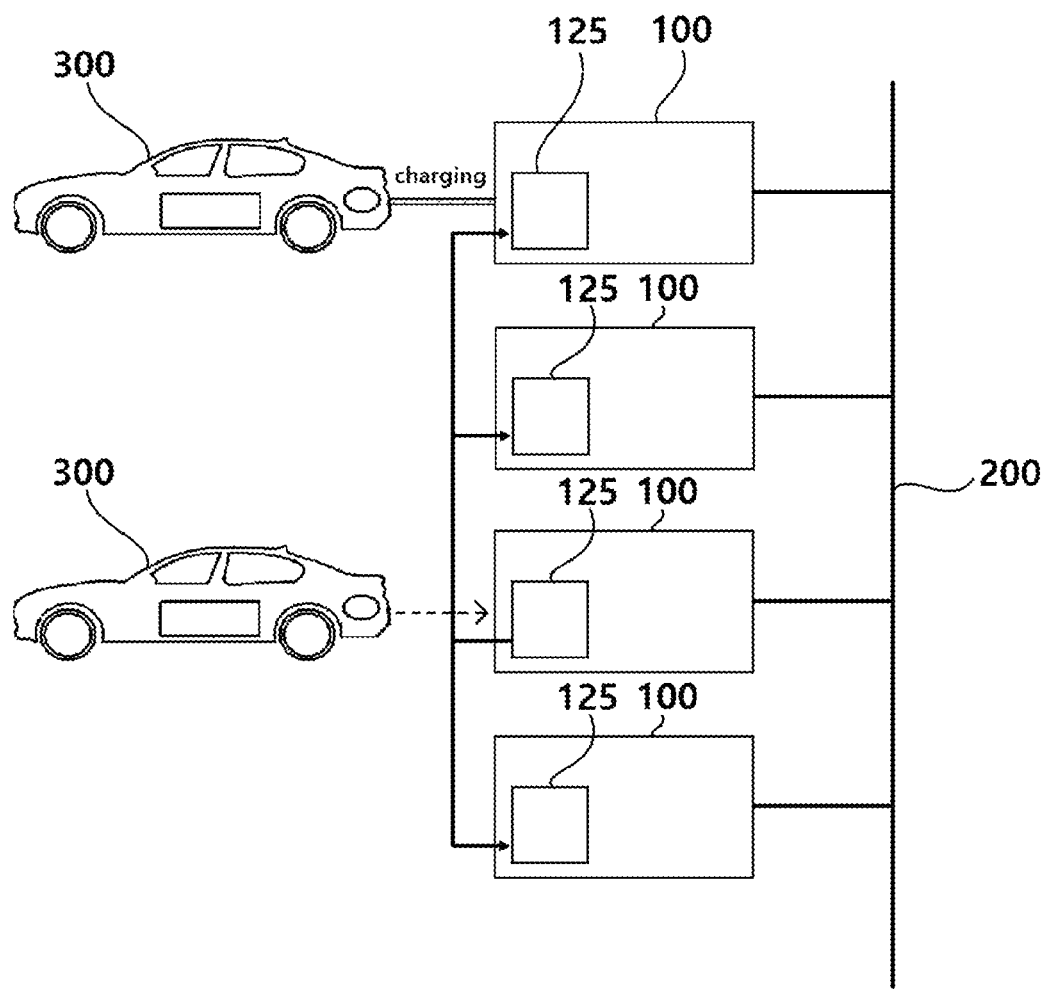
FIGS. 6 and 7 are diagrams illustrating a process in which communication occurs between chargers when a new electric vehicle attempts charging while at least one electric vehicle is being charged.
Figure 7:
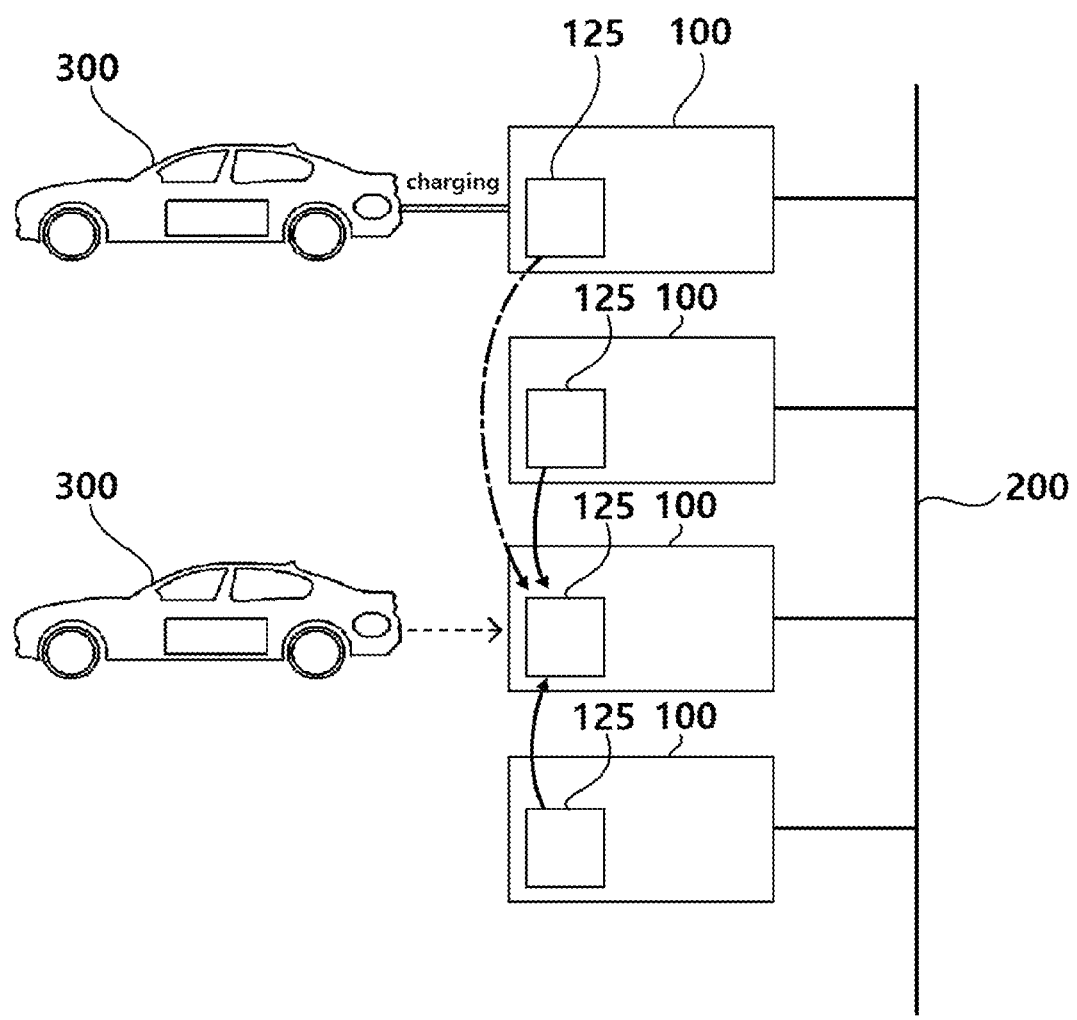

FIGS. 6 and 7 schematically illustrate a mutual communication process between multiple chargers connected to the same power supply source 200 when one electric vehicle 300 is connected to a charger on standby while at least one of the chargers 100 is in use for charging.

According to FIG. 4, it can be seen that when an electric vehicle 300 is connected to a charger 100 on standby, a charging start signal is generated from the charger 100 connected to the electric vehicle 300. The electric vehicle 300 being "connected" to the charger 100 is interpreted not only to mean that the electric vehicle 300 and the charger 100 are directly coupled for charging but also to include a state in which the electric vehicle 300 and the charger 100 are scheduled to be coupled for charging.

When the charger 100 on standby is connected to the electric vehicle 300, the charger 100 connected to the electric vehicle transmits a charging start signal to the other chargers 100 connected to the same power supply source 200.

The charging start signal is a signal generated when the electric vehicle 300 is connected to the charger 100. For example, the charging start signal is generated when the electric vehicle 300 is connected to the connector 110, when the communication controller 310 of the electric vehicle 300 is connected to the communication unit 125, or when the electric vehicle 300 is highly likely to be coupled to the charger 100.

Specifically, when the electric vehicle 300 is connected to the connector 110, the connector 110 may transmit a connection signal to the control unit 120 through the relay unit 123, and upon receiving the connection signal, the control unit 120 may transmit the charging start signal to the other chargers through the communication unit 125. When there is only one connector type for the connector 110, the connector 110 may directly transmit a connection signal to the control unit 120.

Various communication methods may be applied to the multiple chargers 100. In an embodiment of the present invention, a PLC communication method or a P2P communication method may be applied to the chargers, and both of the two communication methods may be applied. The PLC communication method and the P2P communication method are general techniques known to those skilled in the art, and thus a detailed description thereof will be omitted.

In addition to the PLC communication method or the P2P communication method, PWM communication, CAN communication, MOST communication, local interconnect network (LIN) communication, Bluetooth communication, ALOHA communication, beacon communication, or the like may be used for the chargers.

FIG. 5 shows that the other chargers that have received the charging start signal from the charger 100 to which the electric vehicle 300 is connected transmit a charging state signal. The other chargers transmit the charging state signal to the charger where the charging start signal is generated.

The charging state signal may include a charging progress signal and a charging standby signal. The charging progress signal means that charging is in progress, and the charging standby signal means that charging is not in progress.

Specifically, the charging state signal is a signal that contains information on whether the connector 110 is connected to the electric vehicle 300 and whether charging is in progress in the case of wireless charging.

As shown in FIG. 6, when a new electric vehicle 300 is connected while one or more electric vehicles 300 are being charged, the charger 100 to which the new electric vehicle 300 is connected generates a charging start signal and transmits the generated charging start signal to the other chargers.

As shown in FIG. 7, a charger 100 that is in use for charging may generate a charging progress signal and transmit the generated charging progress signal, and a charger 100 that is not in use for charging may generate a charging standby signal and transmit the charging standby signal to the charger where the charging progress signal is generated or may not transmit any signal.

A detailed flowchart of the power supply method of the electric vehicle charger shown in FIGS. 4 to 7 will be described with reference to FIGS. 8 to 11.

Figure 8:
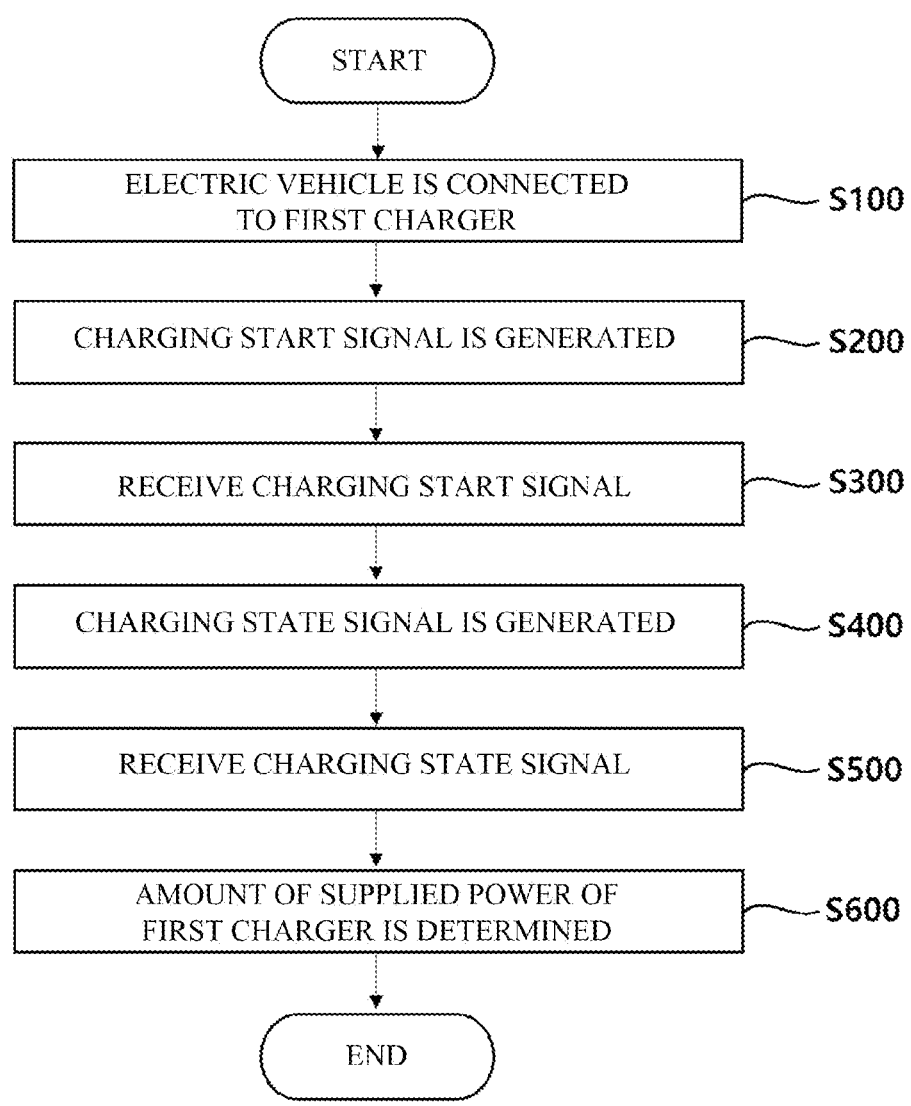
FIG. 8 is a flowchart illustrating a power supply method for charging an electric vehicle when the charging of an electric vehicle starts according to an embodiment.

FIG. 8 illustrates the overall flow of a method in which an electric vehicle charger supplies power when a new electric vehicle attempts charging from the charger.

Each of the operations shown in FIG. 8 may be performed by the control unit 120 and the communication unit 125 provided in each charger 100. However, the present invention is not limited thereto, and at least some or all of the operations shown in FIG. 8 may be performed by another entity.

In operation S100, a first charger among multiple chargers 100 is connected to an electric vehicle 300. The first charger corresponds to an arbitrary charger and even though the charger is referred to as the first charger, it does not have a special state or function. The meaning of the electric vehicle 300 being connected to the first charger has the same meaning as described above.

When the connection between the first charger and the electric vehicle is completed, in operation S200, the control unit 120 of the first charger generates a charging start signal. For example, the control unit 120 receives a charging start signal from a connector or a wireless charging pad (not shown) or generates a charging start signal when charging is confirmed in the near future.

The charging start signal generated by the first charger is transmitted to the chargers other than the first charger in operation S300. That is, the charging start signal is received by the chargers other than the first charger. Each of the chargers that have received the charging start signal stores information indicating that the charging of the first charger is started in a storage unit of a control unit 120 included in the corresponding charger.

In operation S400, the chargers that receive the charging start signal generate a charging state signal. The charging state signal contains information on whether the chargers that have received the charging start signal are charging other electric vehicles 300 at the time when the chargers received the charging start signal.

Specifically, the charging state signal includes a charging progress signal and a charging standby signal. The charging progress signal means that the charging of the electric vehicle is in progress, and the charging standby signal means that the electric vehicle is not being charged.

Meanwhile, according to another embodiment, the charging state signal may include only the charging progress signal.

In operation S500, the first charger receives the charging state signals generated by the other chargers. The control unit 120 of the first charger may determine whether the charging of the chargers is in progress on the basis of the received charging state signal. Information on whether the charging of the chargers is in progress is stored in the control unit 120 of the first charger.

When the charging state signal includes both the charging progress signal and the charging standby signal, the first charger determines the states of the other chargers according to the types of the received signals and stores information on the states of the chargers. On the other hand, when the charging state signal includes only the charging progress signal, whether each of the chargers is on standby for charging may be determined as follows.

Operation 5300 further includes an operation of determining whether the charging state signal is received within a set time (S310). When the chargers other than the first charger are in use for charging, the chargers in use for charging transmits the charging state signal to the first charger within the set time. When the charging progress signal is not received within the set time, the chargers that do not transmit the signal may be determined to be on standby for charging by the control unit 120 of the first charger.

Figure 9:
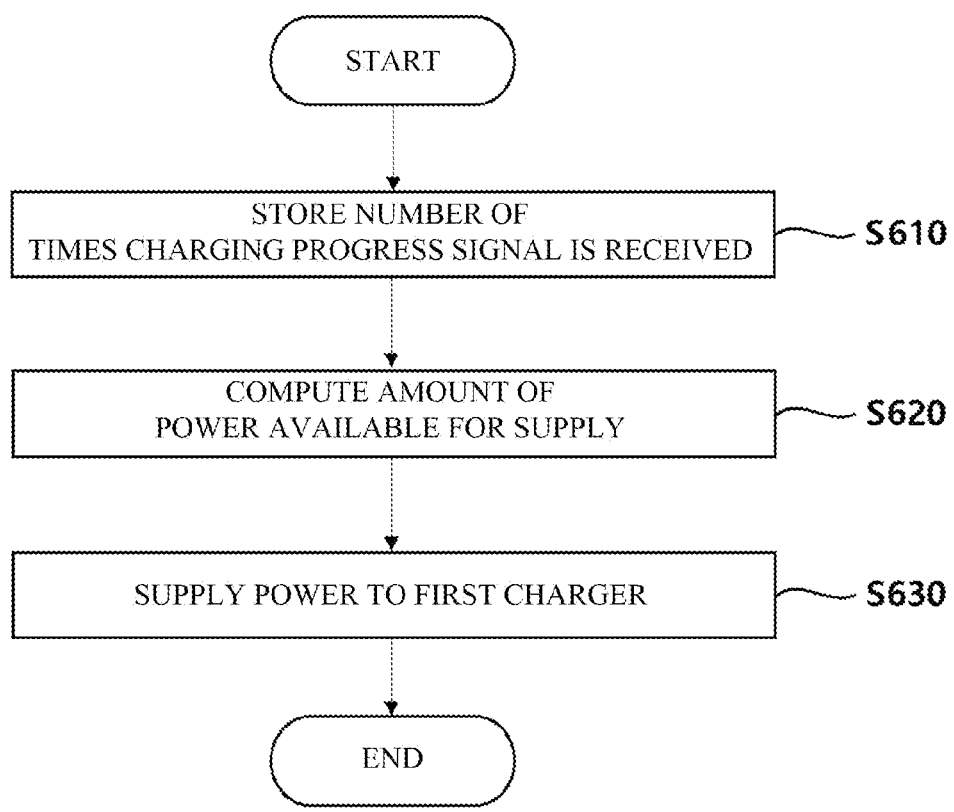
FIG. 9 is a flowchart illustrating a method of calculating the amount of power supplied to each charger.

When the reception of the charging state signal by the first charger is completed and the determination of the current states of the other chargers is completed, operation S600 proceeds, and operation S600 will be described in detail with reference to FIG. 9.

Operation S600 is an operation of determining the amount of power supplied to the first charger. The charging progress signal received in operation S500 is utilized to determine the amount of power supplied to the first charger.

In detail, operation S600 includes, as sub-operations, an operation of storing the number of times the charging progress signal is received (S610), an operation of computing the amount of power available for supply to the first charger (S620), and an operation of supplying the power to the first charger (S630).

Operation S610 is an operation of storing the number of times the charging progress signal is received from the chargers other than the first charger in the control unit 120 of the first charger. The total number of charging progress signals that are received is equal to the total number of chargers that are charging electric vehicles among the chargers that are currently connected to the same power supply source 200. By determining the total number of chargers in use for charging, it is possible to check the maximum amount of power available for supply to the first charger or the range of the amount of power available for supply.

Operation S620 is an operation of computing the amount of available power available for supply to the electric vehicle 300 connected to the first charger by the control unit 120 of the first charger. In particular, operation S620 computes the amount of available power on the basis of the number of times the charging progress signal is received.

For example, the amount of power supplied to the first charger may be less than or equal to a value obtained by dividing the maximum amount of power that can be supplied by the power supply source 200 by one greater than the total number of received charging progress signals. When the maximum amount of power that can be supplied by the power supply source 200 is 10 kWh and the total number of received charging progress signals is 4, the maximum amount of power supplied to the first charger will be less than or equal to 10/5=2 kWh.

Meanwhile, according to an embodiment of the present invention, a time division method may be applied to the method of supplying power from the power supply source 200 to each charger. As in the above example, when the maximum amount of power that can be supplied by the power supply source 200 is 10 kWh and the amount of power available for supply to the first charger is 2 kWh, the control unit of the first charger may perform control such that power is supplied from the power supply source 200 for 12 minutes in a 60-minute section. In any 6-minute section, the first charger receives power alone from the power supply source 200 for 1.2 minutes in the 6-minute section.

When the time division method is applied, a time interval in which each charger receives power is changed according to the number of electric vehicles currently being charged (according to the number of charging progress signals). For example, when the total number of received charging progress signals is three, the total number of electric vehicles connected in the same power supply source 200 will be four. At this time, according to the numbering order of the chargers, the four chargers may receive power alone from the power supply source 200 for a corresponding period of time, i.e., 15 minutes, based on one hour. As a result, this has the same effect as receiving a value obtained by dividing the maximum amount of power of the power supply source 200 by four. The control unit of each charger in use for charging may change the supply and cut-off of power at any time according to the number of charging progress signals.

Meanwhile, when a charger that starts charging first is weighted or when a user who applies for fast charging is weighted, the power supply time may be changed based on one hour. In the above example, the power may be supplied to the electric vehicles for 24 minutes, 18 minutes, 12 minutes, and 6 minutes based on one hour according to the charging start times. This will be described below.

When the amount of power available for supply is determined, operation S630 proceeds.

Figure 10:
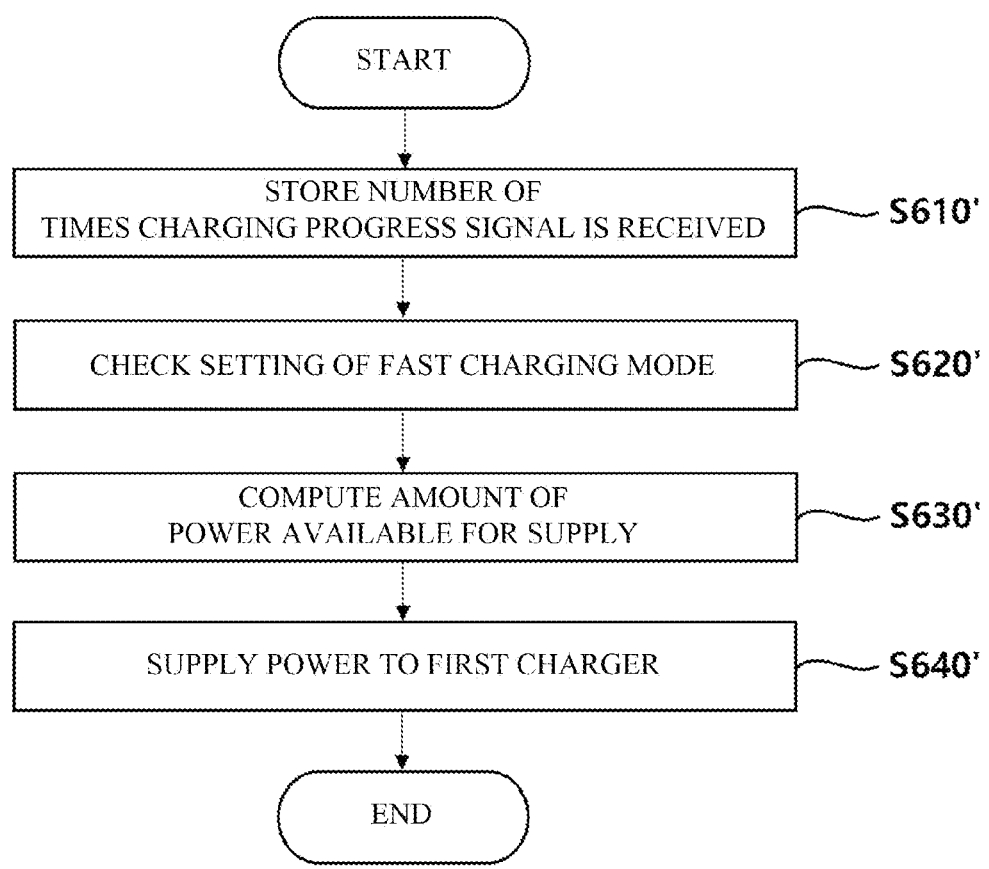
FIG. 10 is a flowchart illustrating a method of calculating the amount of power supplied to each charger according to another embodiment.

Meanwhile, FIG. 10 shows another embodiment of operation S600.

In detail, according to another embodiment, operation S600 includes, as sub-operations, an operation of storing the number of times the charging progress signal is received (S610'), an operation of determining whether the fast charging mode is set for the first charger (S620'), an operation of computing the amount of power available for supply to the first charger (S630'), and an operation of supplying the power to the first charger (S640').

Operation S610' is an operation of storing the number of times the charging progress signal is received from the chargers other than the first charger in the control unit 120 of the first charger and is the same as operation S610.

Operation S620' is an operation of determining whether a user who uses the first charger has selected the fast charging mode before charging is started. The fast charging mode corresponds to a quick charging mode or is a charging mode that guarantees an amount of power equal to or greater than a set value. This mode is useful for users who need fast charging. When the fast charging mode is selected, a user can pay a higher price per kW or a higher basic usage fee than in the normal mode.

Operation S630' is an operation of computing the amount of available power available for supply to the electric vehicle 300 connected to the first charger by the control unit 120 of the first charger and is the same as operation S620. Operation S640' is the same as operation S630.

Operation S630 is an operation in which power supply to the first charger is started, and includes an operation of generating a charging start time signal when the power supply is started (S631) and an operation of the chargers other than the first charger receiving the charging start time signal (S632).

In operation S631, the charging start time of the charger shared with the other chargers is the basis for setting the priority for power distribution when the power distribution is performed. Also, when a payment system is included in each charger, the payment system becomes the basis for calculating the amount of power supplied to the corresponding electric vehicle. That is, the present invention is characterized in that all operations of each charger are shared with the other chargers.

In order to share the charging start time of the first charger with the other chargers, operation S632 proceeds. The other chargers that have received information on the charging start time of the first charger from the first charger store the information in the control unit 120.

Figure 11:
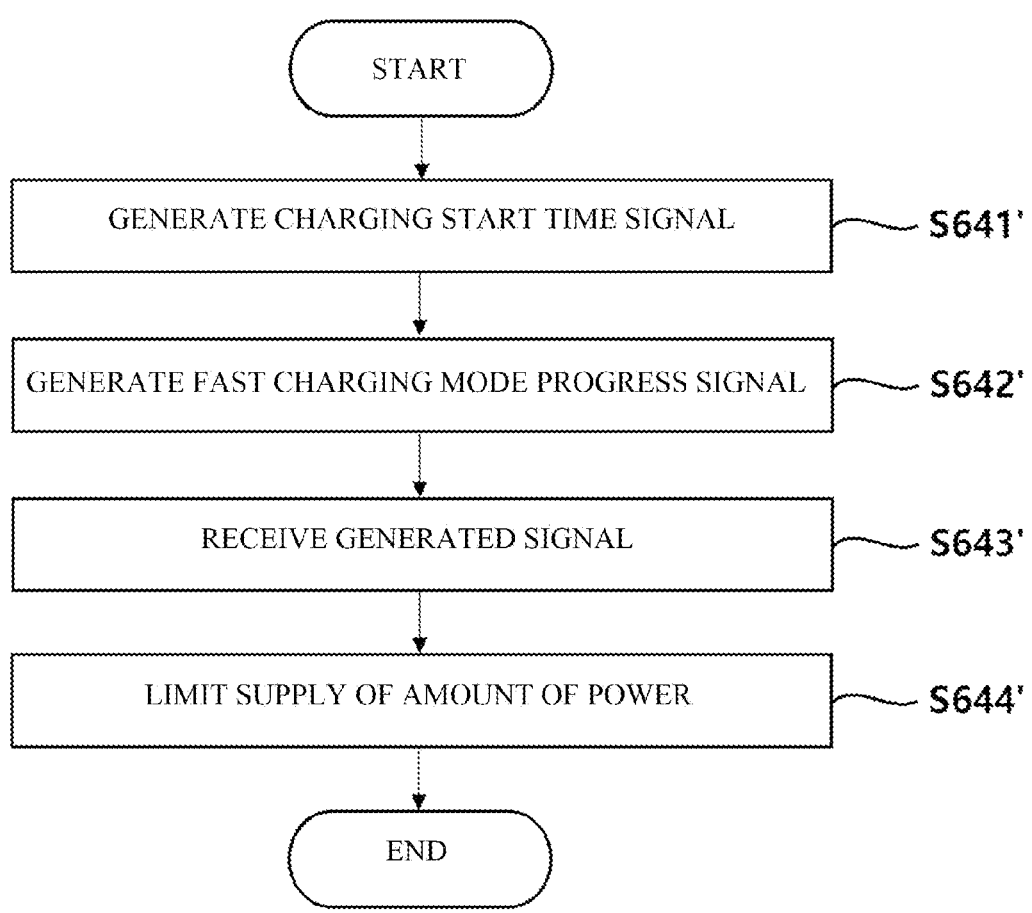
FIG. 11 is a flowchart illustrating a method of calculating the amount of power supplied to each charger when a fast charging mode is applied.

FIG. 11 shows the sub-operations of operation S640' included in the embodiment of FIG. 10.

Operation S640' is an operation in which power supply to the first charger is started, and includes an operation of generating a charging start time signal when the power supply is started (S641'), an operation of generating a signal indicating that the fast charging mode proceeds (S642'), an operation of the chargers other than the first charger receiving the generated charging start time signal and the fast charging mode proceeding signal (S643'), and an operation of limiting the amount of power supplied to the other chargers (S644').

Operations S641', S642', and S643' are operations for sharing important information related to the charging of the first charger with the other chargers.

Operation S644' is an operation for limiting the number of chargers that can select the fast charging mode. In the fast charging mode, high voltage and high power are applied to charge an electric vehicle in a short time, and for this reason, the number of chargers that can simultaneously perform the fast charging mode in the same power supply source needs to be limited to a certain level.

Accordingly, for the other chargers that have received the signal indicating that the fast charging mode of the first charger is in progress, the selection of the fast charging mode may be partially limited or the maximum amount of supplied power supplied may be limited.

The charger that has gone through operation S643' may store the corresponding signal in the control unit 120 and limit the amount of power available for supply on the basis of the stored information. As a result, operation S644' proceeds.

By multiple chargers immediately sharing all charging-related information such as charging start information, charging state information, charging start time information, and fast charging mode progress information, it is possible to efficiently distribute the amount of power to each charger within the maximum amount of power provided by the same power supply source 200 even without a main charger operatively associated with an external server. Also, even when one charger fails, the other chargers can charge electric vehicles without any problem. Also, predetermined chargers may be additionally installed when the maximum amount of power supplied by the power supply source 200 increases, and the installation is terminated when only the minimum communication between chargers is established. Thus, advantageously, it is possible to significantly reduce installation costs and lower repair costs.

Figure 12:
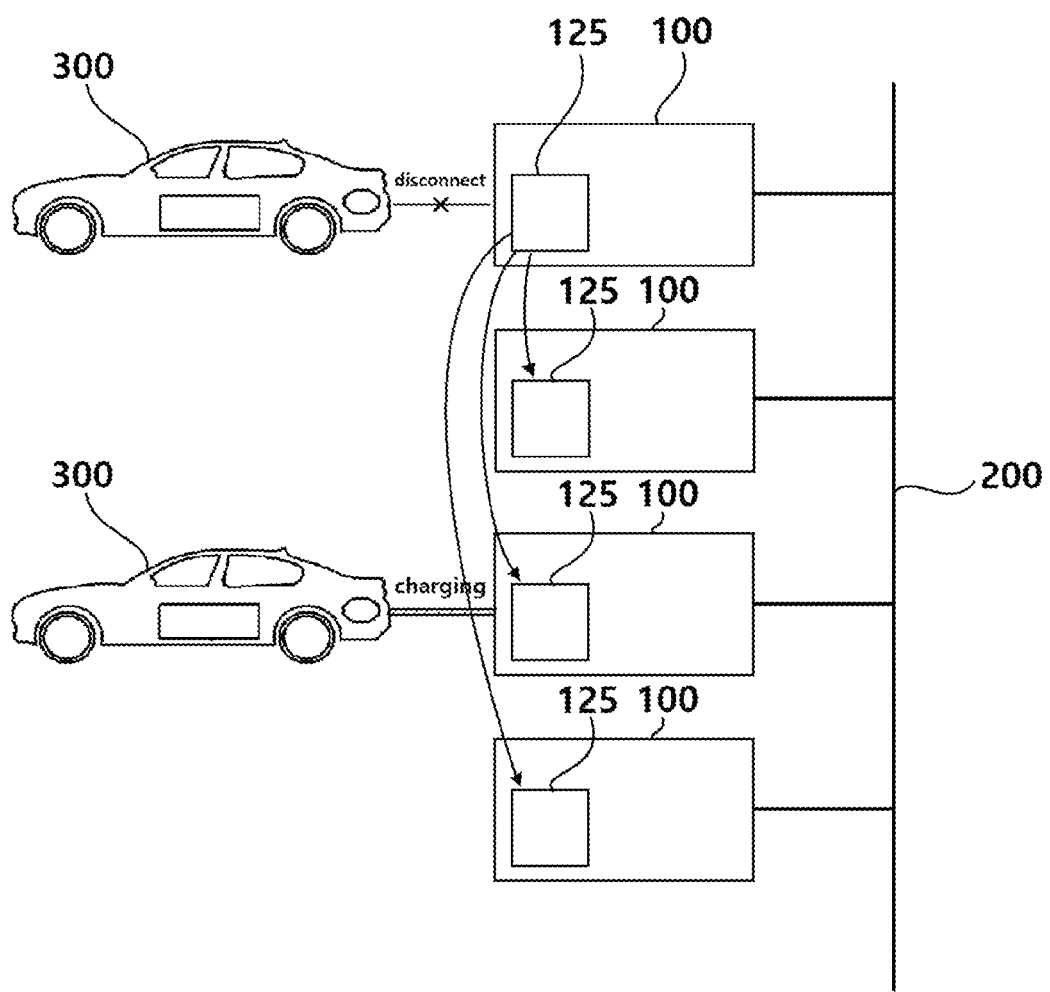
FIG. 12 illustrates an aspect in which communication occurs between chargers when the charging of an electric vehicle is terminated.

FIG. 12 is a schematic diagram illustrating a communication process between multiple chargers when the charging of one electric vehicle 300 is completed.

When the charging of an electric vehicle connected to one charger is completed, the charger and the electric vehicle are disconnected. In an embodiment of the present invention, the connector 110 and the electric vehicle 300 are decoupled, or electricity supply is stopped although the connector 110 and the electric vehicle 300 are coupled to each other. Meanwhile, when the wireless charging mode is applied, the wireless charging pad stops working.

When the charger and the electric vehicle are disconnected, the control unit 120 of the disconnected charger generates a charging termination signal. The generated charging termination signal is transmitted to all the other chargers, and a charger in use for charging may increase the amount of power supplied after the charging termination signal is received. When a time division method is applied, the charger that had received the charging termination signal may increase the time for which power is supplied to the corresponding charger per unit time.

A detailed flowchart in the case where the charging of the electric vehicle is terminated in the power supply method of the electric vehicle charger shown in FIG. 12 will be described through FIGS. 13 and 14.

Figure 13:
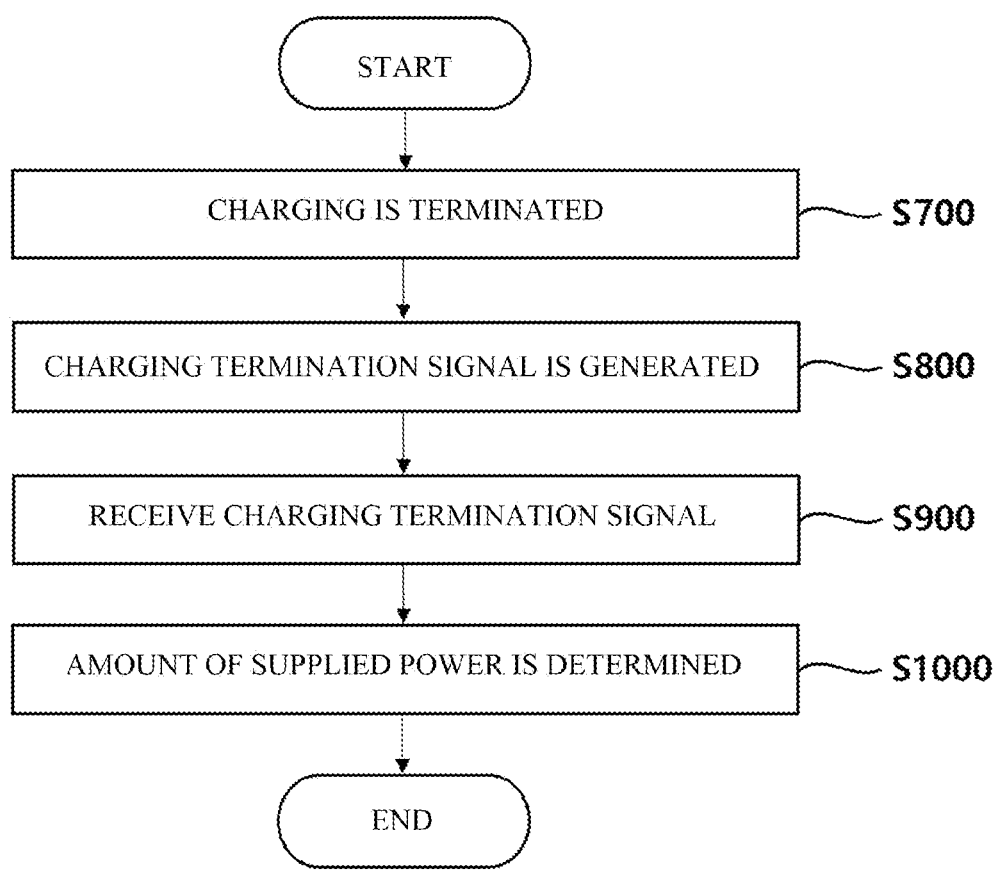
FIG. 13 is a diagram illustrating a method in which power is supplied when the charging of an electric vehicle is terminated according to an embodiment.
Figure 14:
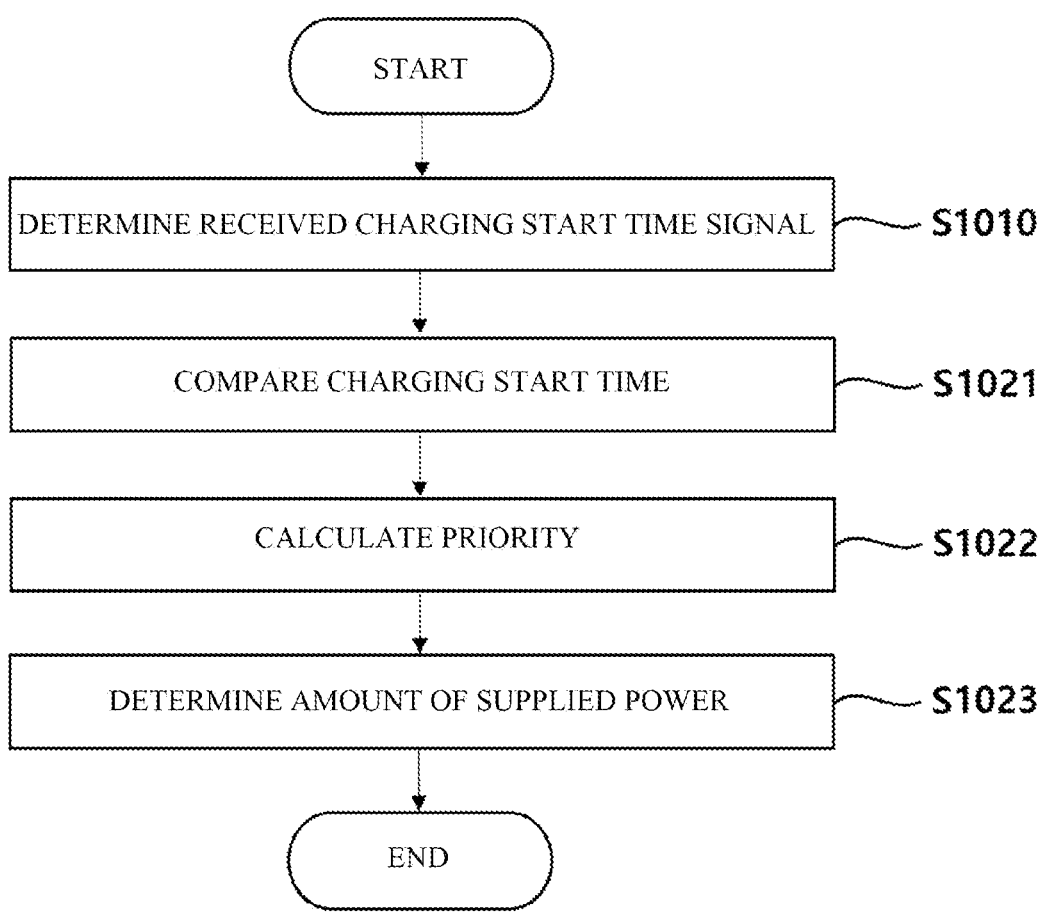
FIG. 14 is a flowchart illustrating a method of supplying an amount of power by utilizing a charging start time.

FIG. 13 illustrates the overall flow of an information delivery process and a power distribution process with other chargers when the charging of one electric vehicle is completed according to an embodiment.

Each of the operations shown in FIG. 13 may be performed by the control unit 120 and the communication unit 125 provided in each charger 100. However, the present invention is not limited thereto, and at least some or all of the operations shown in FIG. 13 may be performed by another entity.

In operation S700, the charging of one charger in use for charging is terminated. All the chargers connected to the same power supply source 200 are eligible to be the charger. The termination of charging may be interpreted as the opposite of the connection between the charger and the electric vehicle. In general, the termination of charging means when the supply of electricity from the charger to the electric vehicle is stopped.

When the charging between the charger and the electric vehicle is terminated, the control unit 120 of the charger that has stopped charging generates a charging termination signal in operation S800.

The generated charging termination signal is transmitted to the chargers other than the charger that has stopped charging in operation S900. That is, the charging termination signal is received by the chargers other than the charger that has stopped charging. The chargers that have received the charging termination signal store, in the storage unit of the control unit 120, information indicating that the charging of any one charger is terminated.

Operation S1000 is an operation of supplying excess power caused by the termination of the charging of any one charger to the other chargers that are still in use for charging, and sub-operations constituting operation S1000 will be described with reference to FIG. 14.

Operation S1000 includes an operation of checking a charging start time received by a third charger (S1010) and an operation of determining the amount of power distributed to the third charger (S1020).

The third charger corresponds to one of the chargers other than the charger that has stopped charging in operation S700. That is, the "third" is only for convenience of description and is not limited to a specific charger.

Operation S1010 is an operation of checking all the charging start time signals of the other chargers that have been received by the third charger. As the number of times multiple vehicles are charged increases, charging start time signal data of a larger number of other chargers will be stored in the control unit 120 of each charger. However, when there is a charging termination signal paired with a specific charging start time signal, the corresponding charging start time signal is excluded from the checking. The reason for checking the charging start time signal is to check information on chargers where charging is performed at the same time as soon as operation S1010 starts. When charging is already terminated, it is meaningless to check the charging start time signal data.

Operation S1020 includes an operation of comparing the charging start time of the third charger to the charging start time signal data checked in operation S1010 (S1021), an operation of calculating the priority between the chargers in use for charging (S1022), and an operation of determining the amount of power supplied to the third charger (S1023).

Operations S1021 and S1022 serve to compare the charging start time signals of the chargers that are in use for charging at the same time and to line up the charger with the fastest charging start time to the charger with the slowest charging start time.

Operation S1023 is an operation of distributing the amount of power according to the calculated priority, and in an embodiment, the largest amount of power may be allocated preferentially to the charger with the fastest charging start time.

Meanwhile, the power supply method of the electric vehicle charger according to an embodiment of the present invention may further include an operation of transmitting a charging amount signal to one or more other chargers at every set time. Through the above operation, chargers connected to one power supply source 200 can always share the charging amount information of electric vehicles connected to the chargers with each other.

Charging amount information refers to information related to the degree to which an electric vehicle connected to a charger is charged, and information on the percentage of charging with respect to a full charging amount when the full charging amount is considered to be 100% may be defined as the charging amount information.

However, in the case of a commercially available charger, the percentage of charging can be determined only in the case of a fast charger. In the case of a charger other than a fast charger, the percentage of charging may be determined through the degree to which the amount of charged power decreases as full charge is reached.

In the case of other chargers, when the approximate charging level exceeds 70-80% compared to the full charging, the amount of supplied power tends to decrease gradually. Therefore, in the case of other chargers, accurate charging amount information may be generated from when the amount of supplied power decreases. In the case of other chargers, charging percentage information according to a rate at which the amount of power decreases may be prestored in the control unit.

The charging amount information may be periodically shared every set time. That is, each charger periodically transmits the charging amount information to chargers other than the corresponding charger and stores the charging amount information of the other chargers in the control unit 120 when the charging amount information is received. By updating the charging amount information in real time, the basis for efficiently changing the amount of supplied power is established.

On the premise that the charging amount information is periodically shared among all the chargers, operation S1000 may include an operation of checking the charging amount of an electric vehicle connected to the third charger, an operation of comparing the charging amount of the electric vehicle connected to the third charger to a pre-received charging amount signal, an operation of calculating priority, and an operation of distributing the amount of power according to the calculated priority. All of the above operations may be performed by the control unit 120 of the third charger.

On the other hand, as the charging amount of the electric vehicle increases, the amount of supplied power decreases. Also, it can be understood that the urgency of charging is low when the charging amount of the electric vehicle is high. In consideration of this, it is possible to efficiently distribute the amount of supplied power by supplying idle power supplied to a charger connected to an electric vehicle with a large charging amount to a charger connected to an electric vehicle with a small charging amount. When a time division method is applied, the charger connected to the electric vehicle with the smaller charging amount may be controlled to have a large time ratio for power supplied to the connected electric vehicle per unit time.

Finally, at least one of the multiple chargers may be provided to enable communication with an external server. A local area network such as WiFi, 3G, and LTE may be utilized for the communication with the external server. By establishing a separate communication facility for at least one charger, a charger reservation system or a payment system may be additionally applied through an application, and it is possible to check the status of the chargers without visiting the site in person.

Meanwhile, at least one of the chargers 100 of FIGS. 4 to 7 may be the movable charger 100' of FIG. 2. The movable charger 100' may be fully charged in the early morning hours when charging demand is low. The fully charged movable charger 100' may serve to assist the power supply source 200 during daytime hours or evening hours after work when charging demand is high.

Specifically, when the amount of power required from the multiple chargers 100 approaches or exceeds the maximum amount of power supplied by the power supply source 200, some of the chargers 100 may receive power from the fully charged movable charger 100'.

The level of the auxiliary role of the movable charger 100' may be set differently depending on the time period. For example, the movable charger 100' may be set to supply the allowable maximum amount of power to other chargers in a time period when the amount of required power is large, and the movable charger 100' may be set to supply the minimum amount of power to other chargers in a time period when the amount of required power is small.

By securing reserve power from the movable charger 100', it is possible to prevent a power outage or a decrease in power supply speed (charging speed).

Although the exemplary embodiments of the present invention have been described with reference to the accompanying drawings, those skilled in the art will appreciate that the present invention may be embodied in other specific forms without departing from the spirit or essential features of the present invention. Therefore, the above embodiments are to be regarded as illustrative rather than restrictive.

The invention claimed is:

1. A power supply method of an electric vehicle charger in which multiple chargers, which include a first charger, a second charger, and a third charger, are connected to the same power supply source, the power supply method comprising:

allowing an electric vehicle to be connected to the first charger;

generating a charging start signal by the first charger;

transmitting, by the first charger, the charging start signal, to each of the second charger and the third charger;

receiving, by the second charger and the third charger, the charging start signal from the first charger;

generating a charging state signal by each of the second charger and the third charger, wherein the charging state signal is a charging progress signal or a charging standby signal, which indicates a charging state of a respective charger of the second charger and the third charger;

receiving, by the first charger, the charging state signals;

determining, by the first charger, an amount of time in an hour period, for supplying power to the electric vehicle by the first charger, based on the charging state signals, by performing:

determining the number of electric vehicles being charged as a sum of one (1) and the number of charging progress signals included in the received charging state signals;

determining the amount of time for supplying power as a division of the hour period by the number of electric vehicles being charged; and exclusively supplying, for the determined amount of time, power to a respective electric vehicle of the electric vehicles being charged;

terminating charging of the second charger;

generating a charging termination signal by the second charger;

transmitting, by the second charger, the charging termination signal to the first charger and the third charger;

receiving, by the first charger and the third charger, the charging termination signal; and determining, by the first charger and the third charger, amounts of supplied power by the first charger and the third charger, based on the charging termination signal.

2. The power supply method of claim 1, wherein the generating the charging state signal comprises:

determining whether an electric vehicle is connected to a third charger;

generating a charging progress signal or a charging standby signal from the third charger; and transmitting the generated signal to the first charger, and the charging progress signal is a signal generated when the electric vehicle is being charged, and the charging standby signal is a signal generated when the third charger is on standby.

3. The power supply method of claim 2, further comprises:

determining an amount of supplied power of the first charger by performing:

storing the number of times the charging progress signal is received;

computing an amount of power available for supply to the first charger; and supplying the power to the first charger, and wherein the amount of power supplied to the first charger reflects the number of times the charging progress signal is received.

4. The power supply method of claim 3, wherein the amount of power supplied to the first charger is less than or equal to a value obtained by dividing the maximum amount of power by one greater than the number of times the charging progress signal is received.

5. The power supply method of claim 3, wherein the determining the amount of supplied power of the first charger further comprises: determining whether a fast charging mode is set, and when the fast charging mode is set, the first charger receives more than a set amount of power from the power supply source.

6. The power supply method of claim 5, wherein the supplying the power to the first charger comprises:

generating a fast charging mode progress signal; and receiving, by the other chargers excluding the first charger, the fast charging mode progress signal, and when the other chargers excluding the first charger receive the fast charging mode progress signal, the maximum amount of power supplied from the power supply source is limited.

7. The power supply method of claim 1, further comprises:

determining the amount of supplied power of the other chargers excluding the second charger by performing:

checking a charging start time signal received by a third charger; and determining the amount of power distributed to the third charger.

8. The power supply method of claim 7, wherein the operation of determining the amount of power distributed to the third charger comprises:

comparing a charging start time of the third charger to the received charging start time signal; and calculating priority, and the amount of distributed power is determined according to the calculated priority.

9. A power supply system of an electric vehicle charger comprising multiple chargers, which include a first charger, a second charger, and a third charger and are connected to the same power supply source, the power supply system is configured to perform:

allowing an electric vehicle to be connected to the first charger;

generating a charging start signal by the first charger;

transmitting, by the first charger, the charging start signal, to each of the second charger and the third charger;

receiving, by the second charger and the third charger, the charging start signal from the first charger;

generating a charging state signal by each of the second charger and the third charger, wherein the charging state signal is a charging progress signal or a charging standby signal, which indicates a charging state of a respective charger of the second charger and the third charger;

receiving, by the first charger, the charging state signals;

determining, by the first charger, an amount of time in an hour period, for supplying power to the electric vehicle by the first charger, based on the charging state signals, by performing:

determining the number of electric vehicles being charged as a sum of one (1) and the number of charging progress signals included in the received charging state signals;

determining the amount of time for supplying power as a division of the hour period by the number of electric vehicles being charged; and exclusively supplying, for the determined amount of time, power to a respective electric vehicle of the electric vehicles being charged;

terminating charging of the second charger;

generating a charging termination signal by the second charger;

transmitting, by the second charger, the charging termination signal to the first charger and the third charger;

receiving, by the first charger and the third charger, the charging termination signal; and determining, by the first charger and the third charger, amounts of supplied power by the first charger and the third charger, based on the charging termination signal.

10. The power supply system of claim 9, wherein each of the chargers comprises:

a connector connected to an electric vehicle and configured to supply power;

a control unit configured to control the amount of power supplied to the connector, the control unit including a communication unit in charge of communication with other chargers; and a connection unit connected to a power supply source and configured to adjust a charging speed according to a signal of the control unit.

11. The power supply system of claim 10, wherein at least one of the multiple chargers is capable of communicating with an external server.

12. The power supply system of claim 10, wherein at least one of the multiple chargers is a movable charger including a movable means for moving to a location where an electric vehicle is parked.

\* \* \* \* \*